Feb. 4, 1958 — E. H. B. BARTELINK — 2,822,537
COMMAND RADAR
Filed Nov. 29, 1945

INVENTOR
EVERHARD H. B. BARTELINK
BY M. A. Hayes
ATTORNEY

United States Patent Office 2,822,537
Patented Feb. 4, 1958

2,822,537

COMMAND RADAR

Everhard H. B. Bartelink, Cambridge, Mass., assignor, by mesne assignments, to the United States of America as represented by the Secretary of the Navy Application November 29, 1945, Serial No. 631,741

7 Claims. (Cl. 343—11)

This invention relates to radar systems and more particularly, to those which furnish information as to altitude, range and azimuth of any aircraft within the operating range.

Certain types of radars exist known as command radars (a radar system operated from surface or airborne position for the purpose of directing other units), which furnish information as to range, altitude and azimuth of a target. However, it often occurs in fighter direction and in aircraft carrying command radars, that the target has an appreciably different altitude from that of the command radar. Inasmuch as the ground range is usually desired, the slant range which is obtained in known radar systems will require a correction to determine ground range. Furthermore, ground clutter produced by the ground reflections of the transmitted pulses will obscure to some degree the data presented on the indicator. In the direction of fighter interceptions, aircraft stacking (aircraft flying the same course at different altitudes), and other aerial operations, it would be advantageous to utilize a command radar system capable of determining the azimuth of, ground range to, and altitude difference of the aircraft in question, and presenting this information on one cathode ray tube or oscilloscope.

It is an object of this invention to provide in a radar system means to furnish directly the ground range and azimuth of a target.

It is a further object of this invention to provide in a radar system means to furnish directly the relative altitude of a target.

It is a further object of this invention to provide in a radar system means to furnish simultaneously azimuth, relative altitude, and ground range of a target.

It is a further object of this invention to provide in a radar system means to eliminate the ground clutter otherwise appearing on the indicator.

It is a further object of this invention to provide in a radar system means to furnish on one cathode ray tube or scope used as an indicator, the azimuth, relative altitude, and ground range of a target.

It is a still further object of this invention to provide in a radar system, means for furnishing location and altitude of aircraft, for traffic control at an airport, the command radar system being located on the ground.

Figure 1:
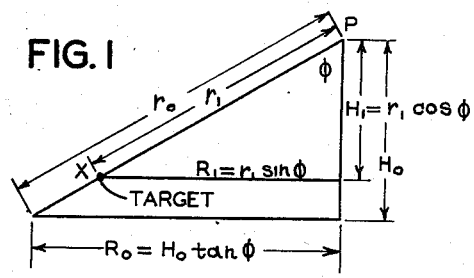
Figure 2:
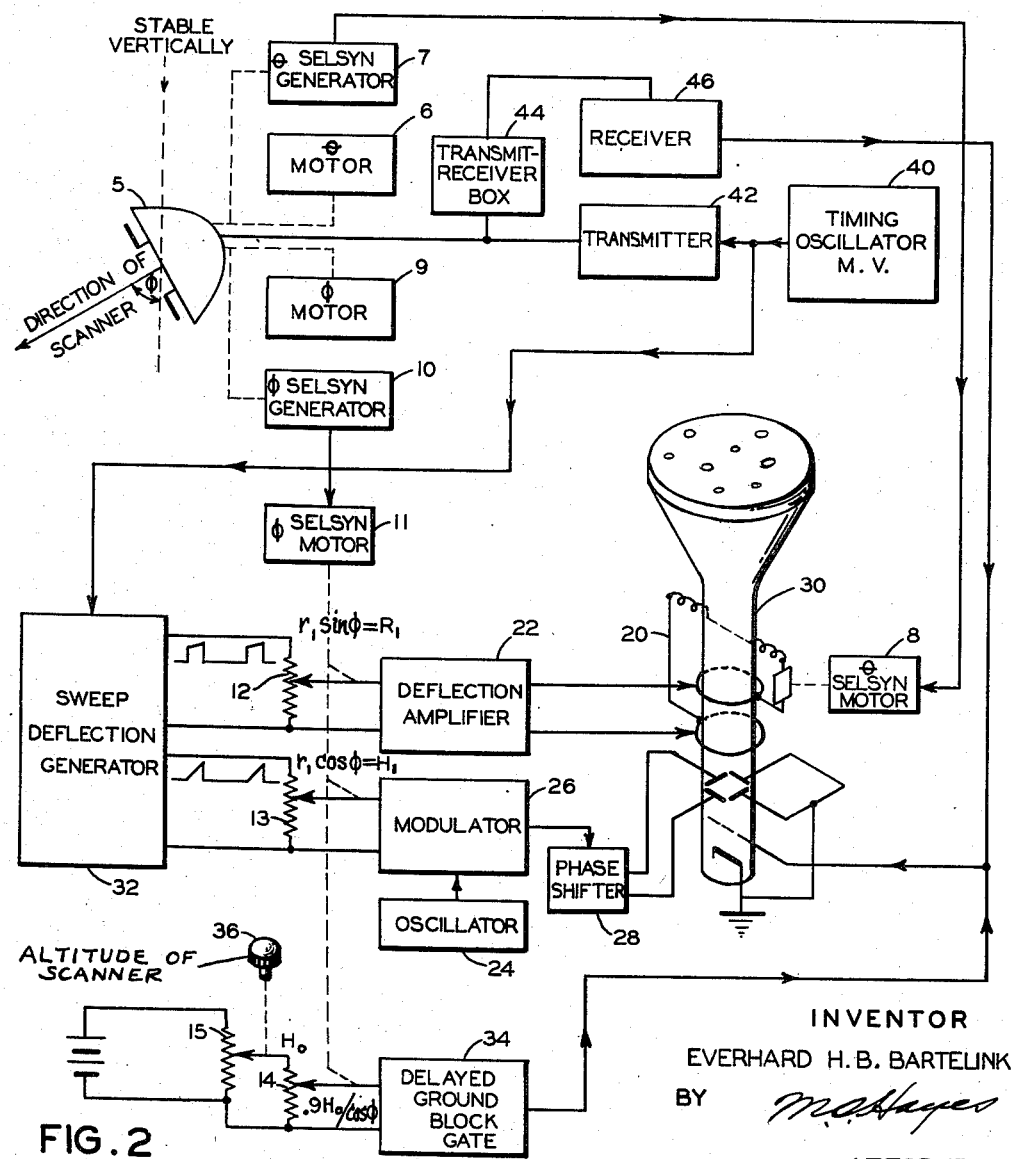

Other and further objects will appear during the course of the following description when taken with the accompanying drawings, in which:

Fig. 1 is a vector diagram of the space relationships for ground range and altitude between a command aircraft and a target aircraft; and Fig. 2 is a block diagram of an embodiment of the invention.

In Fig. 1, the space relationships between a command aircraft and a target aircraft are schematically diagrammed. P represents the position of the command aircraft, and X represents the position of a target aircraft. The only directly measurable distance with a radar at P is slant range $r_1$ to target X. The angle of elevation $\phi$ is also directly measurable in the disclosed embodiment of the invention. Therefore, to determine ground range and altitude difference between target airplane X and command aircraft P the slant range $r_1$ and the functions of the angle of elevation $\phi$ are used. Ground range $R_1$ of the target aircraft at X is equal to the product of slant range $r_1$ and sine of the angle of elevation $\phi$, that is $R_1 = r_1 \sin \phi$. The altitude difference $H_1$ between target aircraft at X and command aircraft at P is equal to the product of slant range $r_1$ and cosine of the angle of elevation $\phi$, that is $H_1 = r_1 \cos \phi$.

In Fig. 2 timing oscillator 40 supplies the triggering voltage to transmitter 42 which supplies the radio frequency (R. F.) pulse of energy to antenna 5. Transmit-receive box 44 prevents an excessive amount of the transmitted R. F. pulse from entering receiver 46 when transmitter 42 is triggered, and allows the reflected image pulse received by antenna 5 from a target to pass through to the crystal mixer of receiver 46. The received and amplified return pulse is then applied to the intensifier grid of cathode ray tube 30. Timing oscillator 40 also supplies the triggering pulse for sweep deflection generator 32. Antenna 5 projects a pencil beam, and is of the spiral scan type, the antenna being stabilized vertically to point in a downward direction. $\theta$ motor 6 is mechanically connected to antenna 5 and furnishes the spinning rotary motion for antenna 5. $\phi$ motor 9 is mechanically connected to spinning antenna 5 controlling and imparting to spinning antenna 5 a nodding motion. The amount of nod can be controlled by $\phi$ motor 9 to such degree as is desired. Thus, the combined action of $\theta$ motor 6 and $\phi$ motor 9 on antenna 5 provide means for spiral scanning motion of antenna 5.

A pair of selsyn systems 7, 8 and 10, 11 transmit azimuth and elevation information from antenna 5 to the radar indicator system. The rotor of azimuth $\theta$ selsyn generator 7 is mechanically connected to the azimuth mechanism of spiral scan antenna 5 and follows the rotation of antenna 5. The stator $\theta$ selsyn generator 7 is electrically connected to the stator of azimuth $\theta$ selsyn motor 8. The rotor of azimuth $\theta$ selsyn motor 8 is mechanically connected to the indicator and controls the rotation of deflection yoke 20 of cathode ray tube 30 therein which then gives a presentation of the Plan Position Indicator or PPI type. Through the action of selsyn system 7, 8 the rotation of the PPI deflection yoke 20 is synchronized with the azimuth rotation of antenna 5. Thus the rotation of the PPI sweep is synchronized with the azimuth rotation of antenna 5 giving a true indication of the relative azimuth of the target aircraft with respect to the command aircraft.

The elevation $\phi$ selsyn system 10, 11 controls the setting of potentiometers 12, 13 and 14. The rotor of $\phi$ selsyn generator 10 is mechanically connected to and synchronized with the nod mechanism of antenna 5. The stator of $\phi$ selsyn generator 10 is electrically connected to the stator of $\phi$ selsyn motor 11. The rotor of $\phi$ selsyn motor is mechanically connected to computing potentiometers 12, 13 and 14. Thus the setting of potentiometers 12, 13 and 14 is synchronized with and follows the angle of nod of the antenna 5.

Sweep deflection generator 32 provides a means of furnishing a trapezoidal voltage, the result of combining a square wave and a sawtooth wave, to computing potentiometer 12. The same sweep deflection generator 32 supplies a sawtooth voltage to computing potentiometer 13. Potentiometer 12 is sinusoidal, that is it is so constructed as to yield a voltage proportional to the product of the slant range and sine of the angle of elevation $\phi$ as the movable contact of the potentiometer is actuated by the rotor of selsyn motor 11. This voltage is applied to deflection amplifier 22. The amplified voltage, proportional to the product of the slant range and sine of the angle of elevation $\phi$ is then applied to the coils of deflection yoke 20. This causes the target to appear on the screen of cathode ray tube 30 at ground range rather than slant range measured from the command airplane. A sawtooth voltage is provided by the sweep deflection generator 32 to computing potentiometer 13. Potentiometer 13 is cosinusoidal, that is it is so constructed as to supply a voltage to the movable contact of potentiometer 13 as the movable contact is actuated by the rotor of selsyn motor 11, proportional to the product of slant range and the cosine of the angle of elevation $\phi$. This voltage applied to modulator 26 amplitude modulates the output of a high frequency oscillator 24. The amplitude modulated output of modulator 26 is applied to a phase shifter 28. The amplitude modulated output is there split, and half of it is shifted 90° or a quarter cycle in phase. The two voltages, 90° apart in phase relationship, are applied to the horizontal and vertical deflection plates of cathode ray tube 30. This produces a rotating field which causes the electron beam to rotate in a circular manner. The diameter of the circle of rotation is proportional to the voltage applied to the horizontal and vertical deflection plates of tube 30. The result is the appearance on the screen of tube 30 of circles representing the targets. The diameters of these circles are proportional to the altitude difference between the targets and the command aircraft.

Potentiometer 14 is supplied by a voltage from potentiometer 15, which is set manually by knob 36 to yield a voltage proportional to the altitude of the command aircraft, is so constructed as to yield a voltage to the movable contact of potentiometer 14 as it is actuated by the rotor of selsyn motor 11, proportional to approximately .9 of the slant range (of this aircraft) to the ground, that is .9$H_0$/cos $\phi$ or .9 of the altitude of the command aircraft divided by the cosine of the angle of elevation. This voltage, proportional to .9 of the slant range of this aircraft to the ground through the target is applied to delayed ground block gate 34. The delayed ground block gate 34, comprising a delay multivibrator and intensifier gate supplies a voltage to the intensifier grid of the PPI oscilloscope, blanking cathode ray tube 30 to any target image return from a target at a greater distance than .9 of the slant range to the ground from the command aircraft thus eliminating ground clutter from the screen of tube 30.

While I have shown a particular embodiment of this invention it will be understood that many modifications may be made without departing from the spirit thereof, and I contemplate by the appended claims to cover any such modifications as fall within the true spirit and scope of this invention.

What is claimed is:

1. In a radar system the combination of a spiral scan antenna, stabilized vertically, a motor for driving said antenna in azimuth, a plan position indicator including a cathode ray tube having an intensifier grid, deflection plates, a deflection coil and a yoke, an azimuth selsyn system between said spiral scan antenna and the deflection yoke of said plan position indicator for the purpose of rotating the yoke of said plan position indicator in synchronization with the rotation of said spiral scan antenna, a motor for driving said spiral scan antenna in a nodding motion simultaneous with the azimuth rotation of said antenna, two potentiometers having rotary sliding contacts, a selsyn system between said antenna and said potentiometers to transmit the nod motion of said antenna to said rotary contacts of said potentiometers, a sweep deflection generator for producing trapezoidal and sawtooth voltage, the outputs of said sweep deflection generator being controlled by two of said potentiometers, the movable contacts of which are actuated by said elevation selsyn system, said potentiometer controlling said trapezoidal voltage from said sweep deflection generator to provide from said trapezoidal voltage output of said sweep deflection generator a voltage varying as the product of the sine of the angle of elevation and the slant range to the target, a deflection amplifier, said varying trapezoidal voltage being applied to said deflection amplifier, the output of said deflection amplifier being applied to the yoke of said plan position indicator for controlling the sweep of the electron beam of said plan position indicator cathode ray tube, said potentiometer controlling said sawtooth voltage from said sweep deflection generator to provide from said sawtooth voltage a voltage varying as the product of the cosine of the angle of elevation and said slant range to said target, a modulator, an oscillator, said last mentioned varying voltage being used to amplitude modulate the output of said oscillator in said modulator, a phase shifter, said amplitude modulated output being applied to said phase shifter, said phase shifter splitting the output of said modulator and shifting half of said output a quarter cycle, the two outputs a quarter cycle out of phase relationship with each other being applied to the horizontal and vertical deflection plates of said cathode ray tube for the purpose of deflecting said electron beam of said cathode ray tube to show on the screen of said tube a circle whose diameter represents the relative altitude of said target aircraft.

2. The combination of claim 1 and a third potentiometer having an adjustable sliding contact, a voltage source, said contact of said third potentiometer being manually set and connected to said source to yield from said voltage source a voltage proportional to the altitude of the aircraft carrying said system, a fourth potentiometer having a rotary sliding contact, fed by the output of said third potentiometer, said fourth potentiometer having said movable contact actuated by the elevation selsyn system in response to said nodding motion to yield a voltage substantially .9 of the slant range of said aircraft to the ground through the target, a source of timed control voltage pulses, said voltage being applied to said source to control the occurrence of said pulse, the output of said source being applied to the intensifier grid of said cathode ray tube for the purpose of biasing said cathode ray tube to blank any target image return from any target at a greater distance than substantially .9 of the slant range to the ground from the plane carrying said system, thus eliminating ground clutter from said plan position indicator.

3. In an airborne radio pulse echo plan position indicator system of the type having a cathode ray indicator, apparatus for determining the ground range and altitude of aerial targets comprising, a directional antenna adapted for transmitting and receiving signals, means rotating said antenna in azimuth and tilting said antenna in elevation to scan a spiral pattern, means to deflect said cathode ray radially with time in indication of range, means to rotate said ray in synchronism with the rotation of said antenna, means to control the amplitude of said deflection in response to the sine function of the elevation angle of said antenna, means to intensify said ray in response to radio pulse echoes from said target, second deflecting means for said ray, a source of high frequency alternating voltage, means to energize said second deflecting means from said source to cause said ray to rotate rapidly while scanning the aforesaid pattern, and means to control the amplitude of said alternating voltage in response to the cosine function of the elevation angle of said antenna whereby said ray traces about the indicated location of said target a circle the diameter of which is proportional to the difference of altitude between said airborne system and said target.

4. In an airborne radio pulse echo plan position indicator system of the type having a cathode ray indicator, apparatus for determining ground range and altitude of aerial targets comprising, a directional antenna adapted for transmitting and receiving signals, means rotating said antenna in azimuth and tilting said antenna in elevation thereby to scan a spiral pattern, means to deflect said cathode ray radially with time in indication of range, means to rotate said ray in synchronism with the rotation of said antenna, means to control the amplitude of said deflection in response to the sine function of the elevation angle of tilt of said antenna, means to intensify said ray in response to radio pulse echo signals from said targets, second deflecting means for said ray, a source of high frequency alternating voltage, means to energize said second deflecting means from said source to cause said ray to rotate rapidly while scanning the aforesaid pattern, means to control the amplitude of said alternating voltage in response to the cosine function of the elevation angle of tilt of said antenna, a source of timed control voltage pulses, means responsive to the altitude of said system and the elevation tilt angle of said antenna to control the time of occurrence of said voltage pulses, and means to apply said voltage pulses to bias said cathode ray indicator whereby said cathode ray tube is blanked to any target at a greater distance than a predetermined proportion of the slant range from said system to the ground in order to eliminate ground clutter from said indicator.

5. In an airborne radio pulse echo plan position indicator system of the type having a cathode ray indicator, apparatus for determining the ground range and altitude of aerial targets comprising, a directional antenna adapted for transmitting and receiving signals, means to rotate said antenna in azimuth and to tilt said antenna in elevation to scan a spiral pattern, a sweep deflection generator means to apply the output of said generator to displace said cathode ray radially with time in indication of range, means to rotate said displaced cathode ray in synchronism with the rotation of said antenna, a first potentiometer connected to vary to modify the output of said sweep generator by the sine function of the angular input motion thereto, electrostatic deflecting means for said ray, a high frequency oscillator, means to energize said deflecting means from said oscillator to cause said ray to rotate rapidly while scanning said pattern, a second potentiometer connected to vary the amplitude of said oscillator output in response to the cosine function of the angular input motion thereto, and means to impart angular motion to said first and second potentiometer in synchronism with the tilt angle of elevation of said antenna.

6. In an airborne radio pulse echo plan position indicator system of the type having a cathode ray indicator, apparatus for determining the ground range and altitude of aerial targets comprising, a directional antenna adapted for transmitting and receiving signals, means to rotate said antenna in azimuth and to tilt said antenna elevation to scan a spiral pattern, a sweep deflection generator means to apply the output of said generator to displace said cathode ray radially with time in indication of range, means to rotate said displaced cathode ray in synchronism with the rotation of said antenna, a first potentiometer connected to modify the output of said sweep generator by the sine function of the angular input motion thereto, electrostatic deflecting means for said ray, a high frequency oscillator, means to energize said deflecting means from said oscillator to cause said ray to rotate rapidly while scanning said pattern, a second potentiometer connected to vary the amplitude of said oscillator output in response to the cosine function of the angular input motion thereto, a source of timed control voltage pulses, means to apply said voltage pulses from said source to bias said cathode ray indicator to nonconduction for the duration of said pulse, means to control the time of occurrence of said pulse in response to the altitude of said system, a third potentiometer connected to vary said control means in response to the reciprocal of the cosine function of the angular input motion thereto, and means to impart angular motion to said first and second and third potentiometers in synchronism with the tilt angle of elevation of said antenna.

7. In an airborne radio pulse echo plan position indicator, a cathode ray indicator having a luminous screen, radio pulse transmitting and pulse echo receiving apparatus, a directional antenna adapted to rotate in azimuth and tilt in elevation to scan a spiral pattern, a rotatable deflection coil adapted to deflect said cathode ray magnetically, a source of timed voltages synchronized to said pulse transmitting apparatus, means to rotate said antenna and said coil in synchronism, means to energize said coil from said source, means to apply echo pulses from said receiving apparatus to said indicator to intensify said ray to trace on said screen an image representing the location of aerial targets, a means to control the amplitude of the voltage energizing said coil from said source in response to the sine function of the angle of elevation imparted to said antenna, whereby the range deflection of said indicator is corrected for said antenna elevation tilt angle to yield directly ground range indication of said targets.

References Cited in the file of this patent

UNITED STATES PATENTS

| | | |
|---|---|---|
| 2,300,189 | Wolff | Oct. 27, 1942 |
| 2,408,742 | Eaton | Oct. 8, 1946 |
| 2,409,448 | Rost et al. | Oct. 15, 1946 |
| 2,417,136 | Smith | Mar. 11, 1947 |
| 2,508,358 | Ayres | May 23, 1950 |
| 2,513,962 | Paterson | July 4, 1950 |
| 2,541,030 | Busignies | Feb. 13, 1951 |

FOREIGN PATENTS

| | | |
|---|---|---|
| 702,686 | Germany | Feb. 13, 1941 |